(12) United States Patent
Teng et al.

(10) Patent No.: US 10,212,605 B2
(45) Date of Patent: Feb. 19, 2019

(54) SHARING OPERATING FREQUENCY AMONGST WIRELESS NETWORKS

(71) Applicant: NOKIA SOLUTIONS AND NETWORKS OY, Espoo (FI)

(72) Inventors: Yong Teng, Beijing (CN); Ling Yu, Kauniainen (FI); Kari Veikko Horneman, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/903,983

(22) PCT Filed: Jul. 11, 2013

(86) PCT No.: PCT/EP2013/064638
§ 371 (c)(1),
(2) Date: Jan. 8, 2016

(87) PCT Pub. No.: WO2015/003749
PCT Pub. Date: Jan. 15, 2015

(65) Prior Publication Data
US 2016/0157103 A1 Jun. 2, 2016

(51) Int. Cl.
*H04W 16/14* (2009.01)
*H04W 72/08* (2009.01)
*H04W 72/04* (2009.01)

(52) U.S. Cl.
CPC ....... *H04W 16/14* (2013.01); *H04W 72/0453* (2013.01); *H04W 72/082* (2013.01)

(58) Field of Classification Search
CPC ............. H04W 16/14; H04W 72/0453; H04W 72/082
See application file for complete search history.

(56) References Cited

U.S. PATENT DOCUMENTS 8,325,657 B2 * 12/2012 Fox ..................... H04W 52/243
370/208
9,065,493 B2 * 6/2015 Hong ..................... H04B 7/024
(Continued)

FOREIGN PATENT DOCUMENTS

| CN | 102884733 A | 1/2013 |
|---|---|---|
| CN | 103002451 A | 3/2013 |

(Continued)

OTHER PUBLICATIONS

International Search Report and Written Opinion for International Application No. PCT/EP2013/064638, dated May 28, 2014, 9 pages.

(Continued)

*Primary Examiner* — Rasheed Gidado
(74) *Attorney, Agent, or Firm* — Brake Hughes Bellermann LLP (57) ABSTRACT

A method, apparatus, and computer program for operating a shared spectrum pool in a cellular communication system is disclosed. The method includes: selecting, by a network apparatus of a first cellular communication system, a first frequency sub-band comprised in a shared spectrum pool of a licensed frequency spectrum as a primary sub-band, wherein the shared spectrum pool is divided into a plurality of sub-bands; forming, by the network apparatus, a frequency allocation pattern for the first frequency band, wherein the frequency allocation pattern specifies frequency allocation to at least one base station of the first cellular communication system within the first frequency sub-band; causing, by the network apparatus, said at least one base station of the first cellular communication system to occupy the first frequency sub-band according to the frequency allocation pattern; and causing, by the network apparatus, at least one base station of the first cellular communication system to occupy a second frequency sub-band comprised in (Continued)

the shared spectrum pool of a licensed frequency spectrum, wherein the second sub-band is a primary sub-band of a second cellular communication system.

18 Claims, 5 Drawing Sheets

(56) References Cited

U.S. PATENT DOCUMENTS

| | | | |
|---|---|---|---|
| 9,578,515 B2* | 2/2017 | Gaal | H04W 16/14 |
| 2009/0161617 A1* | 6/2009 | Abedi | H04W 16/10 |
| | | | 370/329 |
| 2010/0136989 A1* | 6/2010 | Westerberg | H04W 16/14 |
| | | | 455/450 |
| 2010/0214941 A1* | 8/2010 | Hoole | H04B 1/1027 |
| | | | 370/252 |
| 2011/0034198 A1* | 2/2011 | Chen | H04L 1/0029 |
| | | | 455/509 |
| 2012/0122467 A1* | 5/2012 | Auer | H04W 16/10 |
| | | | 455/452.1 |

FOREIGN PATENT DOCUMENTS

| | | |
|---|---|---|
| EP | 2073587 A2 | 6/2009 |
| WO | 2010/091713 A1 | 8/2010 |

OTHER PUBLICATIONS

Kari Hooli, et al.; "WINNER Spectrum Aspects: Methods for efficient sharing, flexible spectrum use and coexistence"; IST-2003-507581 WINNER D.6.1 v1.0; Oct. 2004; 88 pages.
Gustavo Costa, et al.; "1H08 FSU Concept Proposal for LTE-A"; v0.4.5; 39 pages.
First Office Action for Chinese Application No. 2013800793488, dated Jun. 5, 2018, 4 pages.

* cited by examiner

SHARING OPERATING FREQUENCY AMONGST WIRELESS NETWORKS

This application is a national stage entry of PCT Application No. PCT/EP2013/064638, filed Jul. 11, 2013, entitled "SHARING OPERATING FREQUENCY AMONGST WIRELESS NETWORKS" which is hereby incorporated by reference in its entirety.

FIELD

The invention relates to the field of wireless communication systems and, particularly spectrum sharing in such systems.

BACKGROUND

Spectrum sharing is a common feature on unlicensed frequency bands where two different wireless networks may occupy the same frequency band without any regulation. With respect to licensed frequency bands, each operator has typically been assigned with a dedicated frequency band. From the point of view of efficient spectrum utilization, sharing spectrum on licensed frequency bands may be advantageous.

BRIEF DESCRIPTION

The invention is defined by the independent claims.

According to an aspect, there is provided a method comprising: selecting, by a network apparatus of a first cellular communication system, a first frequency sub-band comprised in a shared spectrum pool of a licensed frequency spectrum as a primary sub-band, wherein the shared spectrum pool is divided into a plurality of sub-bands; forming, by the network apparatus, a frequency allocation pattern for the first frequency band, wherein the frequency allocation pattern specifies frequency allocation to at least one base station of the first cellular communication system within the first frequency sub-band; causing, by the network apparatus, said at least one base station of the first cellular communication system to occupy the first frequency sub-band according to the frequency allocation pattern; causing, by the network apparatus, at least one base station of the first cellular communication system to occupy a second frequency sub-band comprised in the shared spectrum pool of a licensed frequency spectrum, wherein the second sub-band is a primary sub-band of a second cellular communication system.

In an embodiment, the method further comprises in the network apparatus: monitoring inter-system interference on at least one of the first frequency band and second frequency band and, upon detecting interference, performing an interference control procedure by requesting at least one base station of the cellular communication system or another cellular communication system to reduce the interference. In an embodiment, the method further comprises in the network apparatus: detecting interference caused by the other cellular communication system on the first frequency sub-band and, as a response causing transmission of a notification of the detected interference to the other cellular communication system.

In an embodiment, the method further comprises in the network apparatus: receiving, by the network apparatus from the second cellular communication system, a notification of detected interference and, as a response, causing transmission of a command to the at least one base station occupying the second frequency sub-band to reduce interference towards the second cellular communication system. The command to reduce the interference towards the second cellular communication system may comprise a command to reduce transmission power. The command to reduce the interference towards the second cellular communication system may comprise a command to release interfered frequency resources on the second frequency-sub-band. The command to reduce the interference towards the second cellular communication system may comprise a command to swap frequency resources between at least two base stations of the first cellular communication system.

In an embodiment, the method further comprises causing the at least one base station of the first cellular communication system to occupy the second frequency sub-band by using the same frequency allocation pattern used in the first frequency sub-band.

In an embodiment, the method further comprises selecting the first frequency sub-band in a prioritized selection process and in communication with other one or more cellular communication systems using the shared spectrum pool, wherein a network apparatus of each cellular communication system selects a frequency sub-band in the prioritized selection process and possible conflicting selections are solved according to predetermined priority orders of the network apparatuses.

In an embodiment, the method further comprises carrying out reselection of frequency sub-bands of the shared spectrum pool upon occurrence of a determined event.

In an embodiment, the method further comprises in the network apparatus: negotiating with at least one network apparatus of another cellular communication system using the shared spectrum pool, spectrum sharing policies applied to the shared spectrum pool, the spectrum sharing policies comprising at least one of the following: bandwidths of the frequency sub-bands of the shared spectrum pool, a number of radio component carriers on each frequency sub-band of the shared spectrum pool, priority order of each network apparatus to each frequency sub-band, and at least one adjustment action carried out when reducing interference towards another cellular communication system. Renegotiation of the spectrum sharing policies applied to the shared spectrum pool may be carried out upon occurrence of a determined event.

In an embodiment, the method further comprises in the network apparatus: assigning a cluster identifier to the at least one base station of the first cellular communication system occupying the second frequency sub-band.

According to another aspect, there is provided an apparatus comprising means for carrying out all the steps of any one of the above-described methods.

According to another aspect, there is provided a computer program product embodied on a distribution medium readable by a computer and comprising program instructions which, when loaded into an apparatus, execute any one of the above-described methods.

According to another aspect, there is provided an apparatus comprising: at least one processor; and at least one memory including a computer program code, wherein the at least one memory and the computer program code are configured, with the at least one processor, to cause the apparatus to: select a first frequency sub-band comprised in a shared spectrum pool of a licensed frequency spectrum as a primary sub-band for a first cellular communication system, wherein the shared spectrum pool is divided into a plurality of sub-bands; form a frequency allocation pattern for the first frequency band, wherein the frequency allocation pattern specifies frequency allocation to at least one base station of the first cellular communication system within the first frequency sub-band; cause said at least one base station of the first cellular communication system to occupy the first frequency sub-band according to the frequency allocation pattern; cause at least one base station of the first cellular communication system to occupy a second frequency sub-band comprised in the shared spectrum pool of a licensed frequency spectrum, wherein the second sub-band is a primary sub-band of a second cellular communication system.

In an embodiment, the at least one memory and the computer program code are configured, with the at least one processor, to cause the apparatus to monitor inter-system interference on at least one of the first frequency band and second frequency band and, upon detecting interference, perform an interference control procedure by requesting at least one base station of the cellular communication system or another cellular communication system to reduce the interference. In an embodiment, the at least one memory and the computer program code are configured, with the at least one processor, to cause the apparatus to detect interference caused by the other cellular communication system on the first frequency sub-band and, as a response cause transmission of a notification of the detected interference to the other cellular communication system.

In an embodiment, the at least one memory and the computer program code are configured, with the at least one processor, to cause the apparatus to: receive, from the second cellular communication system, a notification of detected interference and, as a response, cause transmission of a command to the at least one base station occupying the second frequency sub-band to reduce interference towards the second cellular communication system. In an embodiment, the command to reduce the interference towards the second cellular communication system comprises a command to reduce transmission power. In an embodiment, the command to reduce the interference towards the second cellular communication system comprises a command to release interfered frequency resources on the second frequency-sub-band. In an embodiment, the command to reduce the interference towards the second cellular communication system comprises a command to swap frequency resources between at least two base stations of the first cellular communication system.

In an embodiment, the at least one memory and the computer program code are configured, with the at least one processor, to cause the apparatus to: cause the at least one base station of the first cellular communication system to occupy the second frequency sub-band by using the same frequency allocation pattern used in the first frequency sub-band.

In an embodiment, the at least one memory and the computer program code are configured, with the at least one processor, to cause the apparatus to: select the first frequency sub-band in a prioritized selection process and in communication with other one or more cellular communication systems using the shared spectrum pool, wherein each cellular communication system selects a frequency sub-band in the prioritized selection process and possible conflicting selections are solved according to predetermined priority orders of the cellular communication systems.

In an embodiment, the at least one memory and the computer program code are configured, with the at least one processor, to cause the apparatus to carry out reselection of frequency sub-bands of the shared spectrum pool upon occurrence of a determined event.

In an embodiment, the at least one memory and the computer program code are configured, with the at least one processor, to cause the apparatus to negotiate, with at least one network apparatus of another cellular communication system using the shared spectrum pool, spectrum sharing policies applied to the shared spectrum pool, the spectrum sharing policies comprising at least one of the following: bandwidths of the frequency sub-bands of the shared spectrum pool, a number of radio component carriers on each frequency sub-band of the shared spectrum pool, priority order of each network apparatus to each frequency sub-band, and at least one adjustment action carried out when reducing interference towards another cellular communication system. The at least one memory and the computer program code may be configured, with the at least one processor, to cause the apparatus to carry out renegotiation of the spectrum sharing policies applied to the shared spectrum pool upon occurrence of a determined event.

In an embodiment, the at least one memory and the computer program code are configured, with the at least one processor, to cause the apparatus to assign a cluster identifier to the at least one base station of the first cellular communication system occupying the second frequency sub-band.

In an embodiment, the apparatus further comprises a communication interface providing the apparatus with communication capability with the base stations of the first cellular communication system and with the second communication system.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
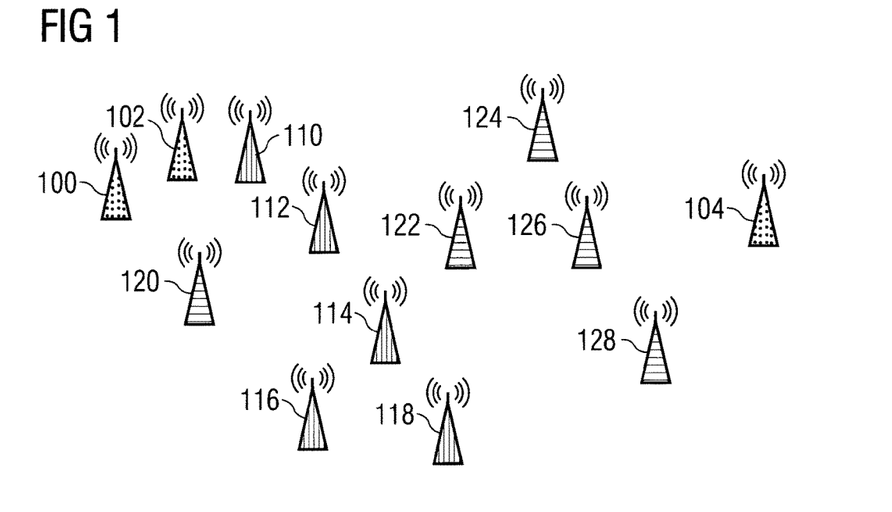
FIG. 1 illustrates cellular communication scenario to which embodiments of the invention may be applied.

FIG. 1 illustrates a wireless communication scenario to which embodiments of the invention may be applied. Referring to FIG. 1, cellular communication networks of different operators have typically overlapping coverage areas. Base stations of different operators are illustrated in FIG. 1 with different filling patterns. For example, base stations 100, 102, 104 marked with dots represent base stations of a cellular communication system operated by a first operator, base stations 110, 112, 114, 116, 118 marked with vertical lining represent base stations of a cellular communication system operated by a second operator, and base stations 120, 122, 124, 126, 128 marked with horizontal lining represent base stations of a cellular communication system operated by a third operator. The cellular communication systems may operate according to specifications of the $3^{rd}$ Generation Partnership Project (3GPP) Long-Term Evolution (LTE) Advanced or its evolution version having cognitive radio (CR) aspects. The cellular communication systems may support co-primary spectrum sharing as a flexible spectrum management and dynamic access scheme with cognitive radio technology. The co-primary spectrum sharing refers to a spectrum access model where two or more primary license holders (e.g. the network operators providing similar radio services) agree on joint use of at least a portion of their licensed spectrum. The exact usage conditions (policies) may be laid down in a mutual agreement, and the entire model may be subject to permission by a national regulator. The regulator may allocate a part of spectrum not exclusively to a single operator but jointly to several potential users (operators) with the obligation to use it collectively under fair conditions and subject to certain rules. The co-primary spectrum sharing will provide more dynamic spectrum sharing between operators providing the same/similar radio services.

The co-primary spectrum sharing together with cognitive radio access procedures may enable higher peak data rates for end users as well as higher capacity in the cellular communication systems, a natural result of increased bandwidth. Such shared spectrum usage seems especially beneficial and appropriate for small cell deployments because these are usually more isolated than large macro cells. The small cells may refer to micro cells, pico cells, and/or femto cells or other types of cells configured to provide radio coverage on a very small area (e.g. a hotspot) compared with the coverage area of macro cell which may span over several square miles. The local area deployments among different operator networks are very much location-dependent. It may not be most favorable to have static spectrum allocation policies among different operators, which is often applied commonly over the whole network area.

Figure 2:
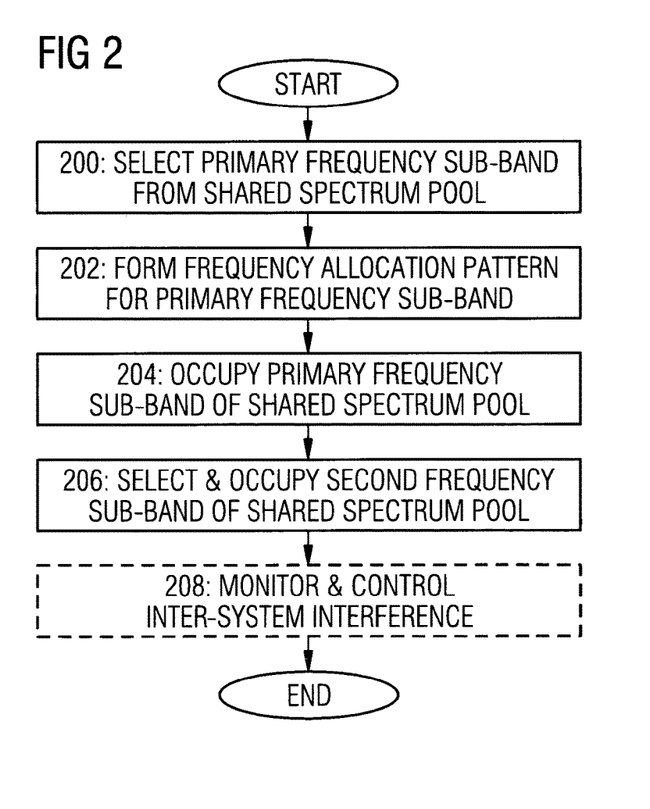
FIG. 2 illustrates a flow diagram of a process for operating in a shared spectrum pool according to an embodiment of the invention.

FIG. 2 illustrates a flow diagram of a process for controlling frequency allocation in a cellular communication system. The process may be carried out by a network apparatus of the cellular communication system, e.g. an operation and maintenance (O&M) server or another frequency allocation controller apparatus or spectrum controller apparatus, or macro base stations or other apparatus which control(s) at least plurality of small cell base stations. The process may be carried out as a computer process according to computer program instructions comprised in a computer program product stored in a computer program distribution medium. Referring to FIG. 2, the network apparatus of a first cellular communication system selects a first frequency sub-band comprised in a shared spectrum pool of a licensed frequency spectrum as a primary sub-band (block 200), wherein the shared spectrum pool is divided into a plurality of sub-bands. In block 202, the network apparatus forms a frequency allocation pattern for the first frequency band, wherein the frequency allocation pattern specifies frequency allocation to at least one base station of the first cellular communication system within the first frequency sub-band. In block 204, the network apparatus configures said at least one base station of the first cellular communication system to occupy the first frequency sub-band according to the frequency allocation pattern. In block 206, the network apparatus configures at least one base station of the first cellular communication system to occupy a second frequency sub-band comprised in the shared spectrum pool of the licensed frequency spectrum, wherein the second sub-band is a primary sub-band of a second cellular communication system. The second cellular communication system or another cellular communication system may also occupy the first frequency sub-band as a secondary sub-band supplementing its respective primary sub-band. In connection with operating on the same frequency band with another cellular communication the network apparatus may monitor and control inter-system interference on the sub-bands where at least two cellular communication systems utilize overlapping frequency resource (block 208). Block 208 is optional, and in some embodiments the inter-system interference management may even be omitted. In such embodiments, the cellular communication system may rely on its internal interference reduction/control procedures such as using more reliable modulation and coding schemes etc. In an embodiment of block 208, the network apparatus detects interference caused by another cellular communication system on the first frequency sub-band and, as a response causes transmission of a notification of the detected interference to the other cellular communication system. In another embodiment of block 208, the network apparatus receives from the second cellular communication system a notification of detected interference and, as a response, causes transmission of a command to the at least one base station occupying the second frequency sub-band to reduce interference towards the second cellular communication system.

The above-described embodiment provides a method for sharing licensed frequencies amongst different operators. The method provides a fair sharing in the sense that each operator has its primary frequency sub-band which it controls and, additionally, the operator may try to expand its operating frequencies to primary frequency sub-bands of other operators. However, if the other operator indicates that the expansion has caused interference, the expanding operator is obliged to adjust its operation such that the interference is reduced. Then quality of service (QoS) of the operators is always guaranteed while spectrum sharing is enabled between the operators. This method is scalable to account for an arbitrary number of operators.

In an embodiment, the shared spectrum pool is divided into a number of frequency sub-bands that equals to the number of operators sharing the shared spectrum pool.

The primary frequency band of the cellular communication system may be understood as a frequency sub-band to which the cellular communication system has a higher priority than the other cellular communication systems. The higher priority may be associated with a right to instruct the other cellular communication systems operating on the frequency sub-band to operate on the frequency sub-band according to the requirements laid down by the network apparatus of the cellular communication system. For example, in case of detecting inter-system interference, the other cellular communication systems are obliged to change their operating parameters such that the interference is reduced. The priority may be used in the selection of the frequency sub-band in block 200, as described below with reference to FIG. 3.

Figure 3:
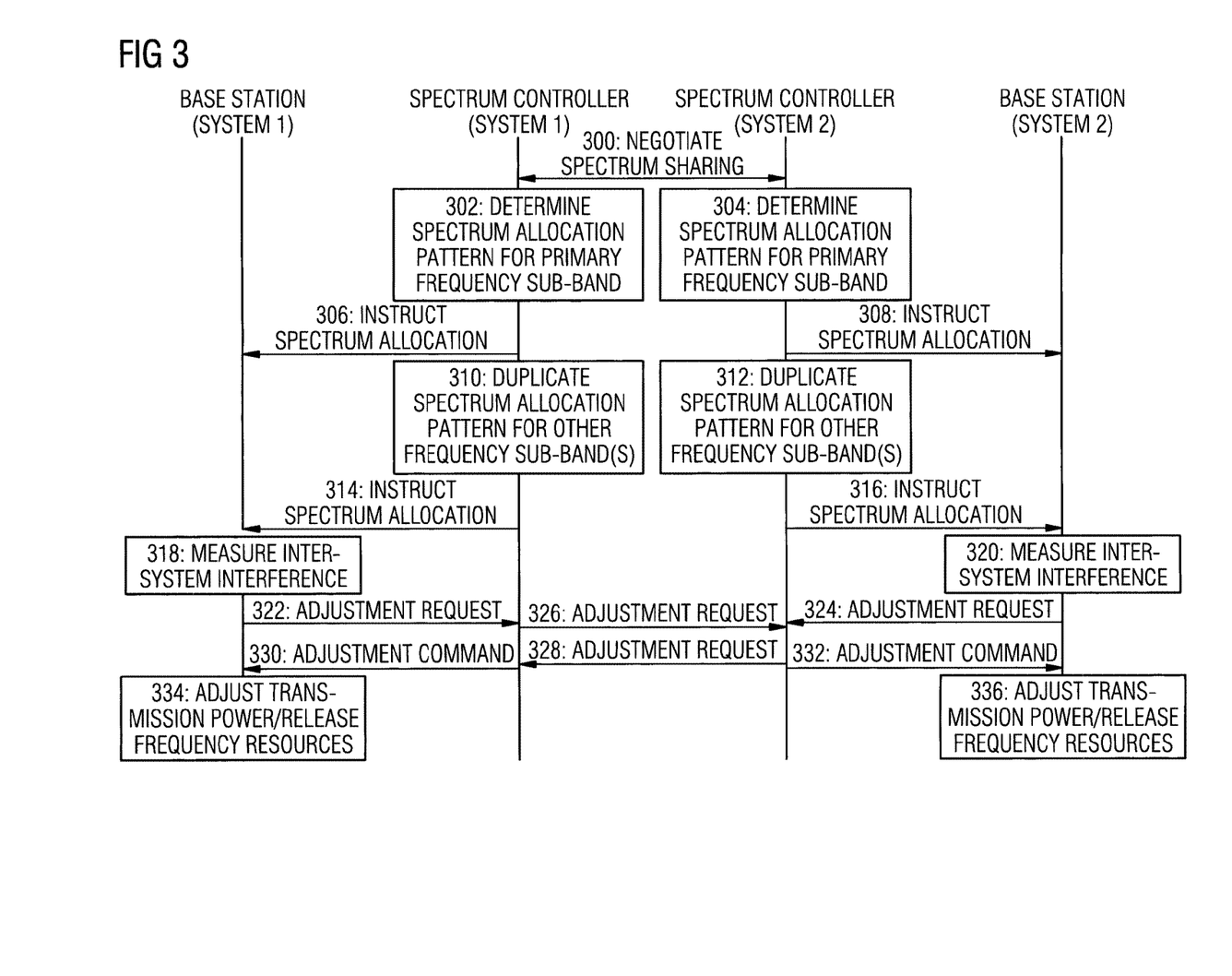
FIG. 3 illustrates a signalling diagram of cooperation between two cellular communication systems operating in the shared spectrum pool according to an embodiment of the invention.

Let us now describe the process of FIG. 2 in the multi-operator situation with reference to a signalling diagram of FIG. 3. FIG. 3 illustrates network apparatuses, e.g. spectrum controllers, of two different cellular communication systems and a base station of each cellular communication system. In reality, the number of base stations in each system may be higher but similar approach may be applied to the other base stations in a straightforward manner. Referring to FIG. 3, a first spectrum controller of a first cellular communication system and a second spectrum controller of a second cellular communication system may negotiate about the spectrum sharing in step 300. The spectrum controllers may establish a communication connection, e.g. an internet protocol (IP) connection, in order to exchange messages related to the spectrum sharing. Step 300 may be understood as a preconfiguration phase where the operators agree on spectrum sharing policies and the sub-band division and allocation. The spectrum sharing policies may comprise at least one of the following: bandwidths of the frequency sub-bands of the shared spectrum pool, a number of radio component carriers on each frequency sub-band of the shared spectrum pool, priority order of each network apparatus to each frequency sub-band, an event that triggers reallocation of frequency-sub-bands, and at least one adjustment action carried out when reducing interference towards another cellular communication system. The event may be time-based, e.g. a determined reallocation periodicity, or trigger-based. The adjustment action may comprise at least one of reducing transmission power on the interfered frequency resources and releasing the interfered frequency resources, or possible other actions e.g. swapping or reallocating at least parts of used frequency resources for two or more base stations. The spectrum sharing policies may also be renegotiated upon occurrence of a determined event, wherein the event may be a time-based event such a expiry of a renegotiation periodicity or non-time based event. Accordingly, the negotiation may also be a dynamic or a semi-static property.

Step 300 may further comprise the allocation of the frequency sub-bands between the operators. As a result, each operator may acquire a frequency sub-band for use as the primary frequency sub-band. In an embodiment, the allocation may be based on the above-described priority orders. Each operator may have the highest priority to one frequency sub-band and, as a consequence, the different operators have the highest priority on different frequency sub-bands. First, each spectrum controller may autonomously select one of the frequency sub-bands as the primary frequency sub-band. The selection may be based on an estimate of required capacity etc. and the spectrum controller may select a frequency sub-band that corresponds to current requirements. If there are conflicts, e.g. two spectrum controllers have selected the same frequency sub-band, the spectrum controller that has the highest priority to that frequency sub-band may assume the selected frequency sub-band. In another embodiment employing no priorities in this step, the spectrum controllers may obey first-come-first-served rules, e.g. a spectrum controller that makes a first reservation on a frequency sub-band may assume the frequency sub-band as the primary sub-band. In case of a conflict, e.g. another operator also made a reservation to the same frequency sub-band but was too late, the other operator who gave up and chose another sub-band as the primary sub-band may gain a priority in the next round when a second primary sub-band is being selected (in case multiple primary sub-bands are employed). Then, procedure may continue for choosing the second primary sub-band and so on until all the frequency sub-bands have been allocated. Generally, the spectrum sharing may be limited to a few operators, .e.g. two or three. This procedure is easy to execute and refine each round according to the priorities between the operators pairs determined during the previous selection round.

There may be provided multiple frequency sub-band sharing procedures within the whole network coverage. The sharing procedure may be geo-location dependent, for example, and different sharing procedures may be carried out between the operators in different geo-location areas.

Figure 4A:
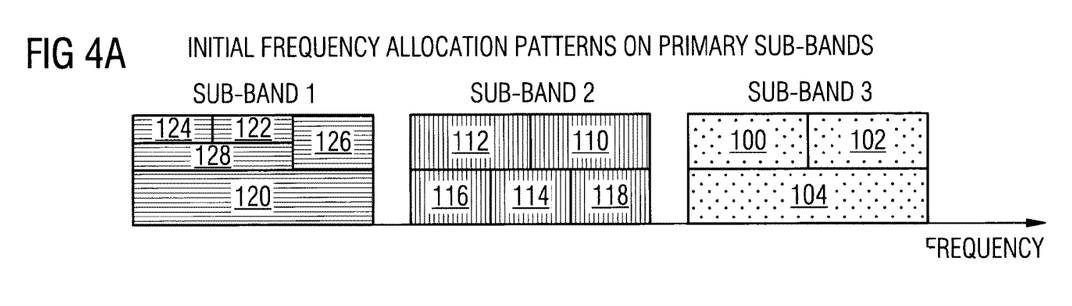
FIGS. 4A, 4B, and 4C illustrate spectrum sharing at different stages according to an embodiment of the invention.

When the primary frequency sub-bands have been allocated, the first spectrum controller and the second spectrum controller may determine respective spectrum allocation patterns in blocks 302, 304. Each spectrum controller may carry out the determination of the spectrum allocation pattern autonomously. Blocks 302, 304 may comprise determining base stations to be allocated to the primary frequency sub-band(s) and allocating bandwidth within the primary frequency sub-band(s) to the determined base stations. FIG. 4A represents an example of the frequency allocation patterns for the cellular communication systems of FIG. 1. The spectrum controller of the first operator (dotted marking) may assume a frequency sub-band 3 as the primary frequency sub-band and allocate frequency resources to the base stations 100 to 104 from the frequency sub-band 3. The spectrum controller of the second operator (vertical lining) may assume a frequency sub-band 2 as the primary frequency sub-band and allocate frequency resources to the base stations 110 to 118 from the frequency sub-band 2. The spectrum controller of the third operator (horizontal lining) may assume a frequency sub-band 1 as the primary frequency sub-band and allocate frequency resources to the base stations 120 to 128 from the frequency sub-band 1. The spectrum controllers may employ knowledge of geo-locations of the base stations when determining the frequency allocation pattern. For example, the spectrum controller of the first cellular communication system may assign the same frequency resources to the base station 104 as assigned to the base station 100 or 102 because the base station 104 is remote to the other base stations 100, 102 and interference between them is not possible because of attenuation of radio waves over a long distance.

In another embodiment, the determination of the frequency allocation pattern may be carried out in a distributed manner where the base stations, for example, autonomously select the frequency resources they will occupy. According to this embodiment, the frequency allocation pattern from the viewpoint of the spectrum controller may comprehend the primary frequency sub-band(s) as a whole and the sub-division of the frequency resources of the primary frequency sub-bands may be carried out by one or more other apparatuses of the cellular communication system.

In step 306, the first spectrum controller instructs the base stations of the first cellular communication system to occupy the operating frequencies according to the frequency allocation pattern determined in block 302. Similarly, the second spectrum controller instructs in block 308 the base stations of the second cellular communication system to occupy the operating frequencies according to the frequency allocation pattern determined in block 304. Accordingly, the base stations may occupy the frequency resources of the primary frequency sub-band(s).

The frequency allocation pattern may be static or semi-static in the sense that the frequency allocation pattern may be maintained unless new cells are created or existing cells are turned off.

In FIG. 4A, the group of base stations operating on the same frequency sub-band may form a spectrum sharing cluster. The network controllers may setup one or several spectrum sharing clusters. A spectrum sharing cluster may include a plurality of cells and each spectrum sharing cluster may be allocated with a unique cluster identifier. For example, the first spectrum controller may assign a common cluster identifier to base stations 100 to 104 sharing the sub-band 3.

Figure 4B:
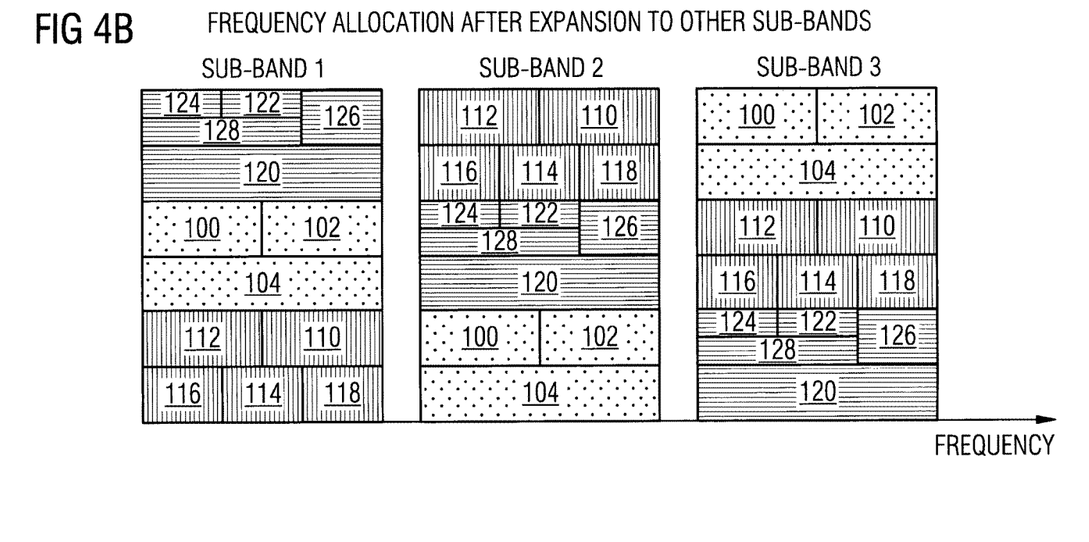

In block 310, the first spectrum controller determines to expand the operating frequencies of the first cellular communication system to other frequency sub-band(s) of the shared spectrum pool. In this example, let us assume that the first spectrum controller determines to expand to the primary frequency sub-band of the second cellular communication system. The first spectrum controller may determine a frequency allocation pattern for the primary frequency sub-band of the second cellular communication system. Similarly, the second spectrum controller determines to expand its operating frequencies to the primary frequency sub-band of the first cellular communication system and a corresponding frequency allocation pattern in block 312. In an embodiment, the spectrum controllers duplicate the frequency allocation pattern determined for the primary frequency sub-bands in blocks 302, 304. The spectrum controllers instruct the respective bases stations to assume the frequency allocation pattern for the expansion in steps 314, 316. FIG. 4B illustrates frequency occupation as a result of execution of steps 314, 316 and corresponding steps carried out by a third spectrum controller of the third cellular communication system. As shown in FIG. 4B, now all cellular communication systems operate on all frequency sub-bands of the shared spectrum pool. It should be appreciated that it is not necessary for all the spectrum controllers to expand to all the frequency sub-bands of the shared spectrum pool, and any spectrum controller may determine to expand to a subset of frequency sub-bands comprising at least one sub-band that is not a primary sub-band of the cellular communication system of the spectrum controller.

The spectrum controller may use the above-described cluster identifier to address the spectrum sharing cluster as a whole and, accordingly, instruct all the base stations of the spectrum sharing cluster to carry out the expansion by using a single signaling message addressed to the cluster identifier. This is particularly advantageous when the frequency allocation pattern is duplicated to the other non-primary frequency sub-band, because the spectrum controller may simply refer to the existing frequency allocation pattern and use a short instruction word, even one bit, to copy the existing frequency allocation pattern to the new frequency sub-band.

Now, as multiple operators operate on the same frequency band as shown in FIG. 4B, it is possible that inter-system interference will occur because of overlapping operating frequencies and overlapping coverage areas of the cellular communication systems. In blocks 318 and 320, the base stations of the cellular communication systems perform measurements at least on their primary frequency sub-bands. The base stations may measure signal strengths of signals received from neighboring cells of other cellular communication systems. The signal strength may be represented by a measured received signal strength indicator (RSSI), reference signal received power (RSRP), or another metric. The base stations may discriminate the neighboring cells of the other cellular communication systems on the basis of their cell identifiers comprised in broadcast messages the base stations transmit. The base stations may compare the measured signal strengths with an interference threshold and, if the measured signal strength exceeds the threshold, the base station may determine a neighboring base station that causes the interference and, optionally, a corresponding operator. Different operators may have different cell identifier ranges. In an embodiment, the base station detecting the interference may report the notification of the interference and a cell identifier of the interfering base station to the spectrum controller. The spectrum controller may store cell identifiers assigned to different operators and determine an operator whose base station is causing the interference. In another embodiment, the base station stores the cell identifiers assigned to the different operators and determines the operator whose base station is causing the interference. The base station may then report the cell identifier of the interfering base station and the operator to the spectrum controller. Referring to FIG. 3, when a base station of the first cellular communication system detects the interference from the second cellular communication system, the base station may send an adjustment request (step 322) to the first spectrum controller. Similarly when a base station of the second cellular communication system detects the interference from the first cellular communication system, the base station may send an adjustment request (step 324) to the second spectrum controller. The adjustment request may comprise the above-described notification of the detected interference and the cell identifier of the interfering base station and, optionally, the operator of the interfering base station. Upon receiving the adjustment request (steps 322, 324), each spectrum controller may determine a network operator whose base station is causing the interference on the primary sub-band of its cellular communication system and forward the adjustment request or send a refined adjustment request to the spectrum controller of the interfering operator (steps 326, 328). In an embodiment, the adjustment request(s) further comprises a measure indicating the strength of the interference, e.g. the RSSI value. In an embodiment the adjustment request(s) further comprises an information element indicating frequency resources on which the interference was detected, as provided by the measuring base station.

Figure 4C:
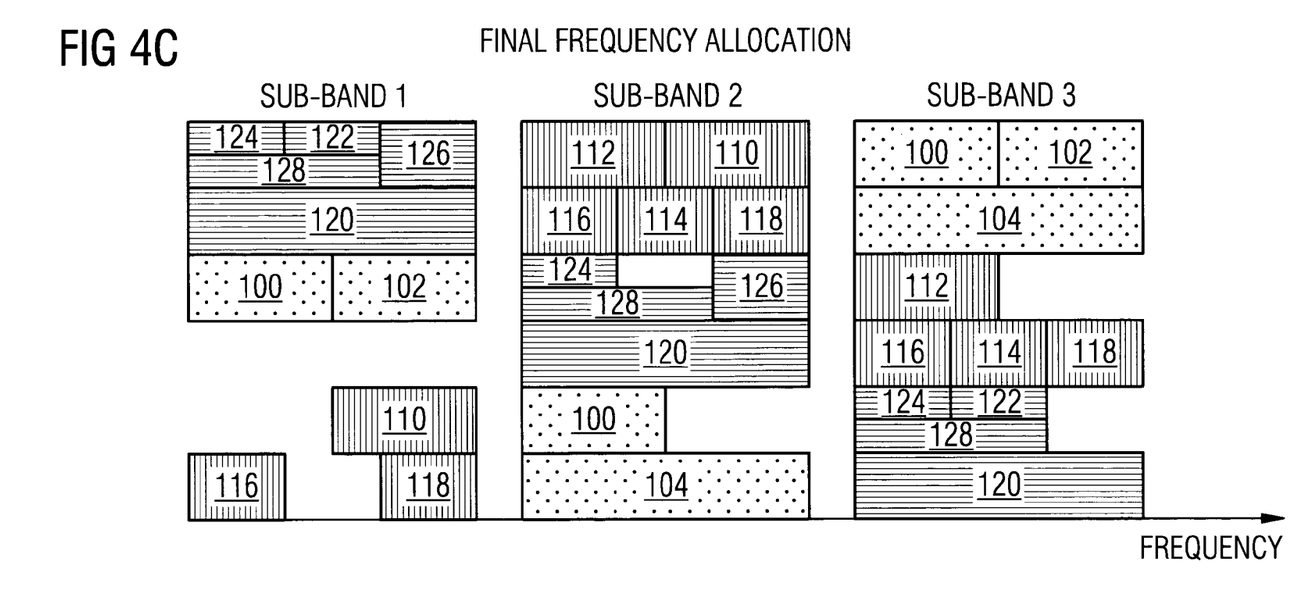

Upon receiving the adjustment request, the spectrum controller may extract from the received adjustment request a cell identifier of the interfering base station and determine the type(s) of interference reduction policies negotiated in step 300. Then, the spectrum controller may transmit an adjustment command to the base station(s) that interfere(s) the other cellular communication system (steps 330, 332). The adjustment command may comprise a command to reduce transmission power and/or a command to release the frequency resource(s) on which the interference has been detected, or another command e.g. swapping or reallocating at least a subset of allocated frequency resources between two or more base stations of the same cellular communication system. The swap may be made between two base stations that are not neighboring base stations in order to ensure that the swapping reduces or eliminates the interference towards the interfered system. The identified base station(s) may then reduce the transmission power, release the interfered frequency resources or even all the frequency resources on the interfered primary frequency sub-band of the other cellular communication system, or swap at least a subset of frequency resources with one or more other base station(s) of the same cellular communication system (blocks 334, 336). FIG. 4C illustrates a result of the measurements, interference reporting, and adjustments. Because of causing interference towards the primary operator of the frequency sub-bands, the base station 104 releases the frequency sub-band 1 upon receiving a command to reduce the interference towards the third cellular communication system. Similarly, the base stations 112 and 114 of the second cellular communication system had to quit the operation on the sub-band 1, the base stations 122 and 102 had to quit the operation on the sub-band 2, and the base stations 110 and 126 had to quit the operation on the sub-band 3. As a result, the three operators may share all the frequency sub-bands without causing inter-system interference and, even if the interference occurs, the primary operator of each frequency sub-band may request the interfering operator to adjust the operating parameters such that the interference is negated. Accordingly, capacity of all cellular communication systems may be improved without inter-system interference.

In an embodiment, the base station and/or the spectrum controller starts a timer when sending the adjustment request (steps 322 to 328). If the interference is still detected after the expiry of the timer, the base station and/or the spectrum controller may send another adjustment request towards the interfering cellular communication system.

In an embodiment, the base station may transmit a broadcast message on the primary frequency sub-band on which the interference was detected. The broadcast message may comprise an information element indicating the frequency resources on which the interference has been detected. A unit of the interference resource may be a component carrier, e.g. a bandwidth assigned to a radio frequency carrier. The information element may comprise a bitmap indicating whether or not each frequency resource on the primary sub-band is interfered. In another embodiment, the base station indicates only the interfered frequency resources. The base stations operating on the primary frequency sub-band are configured to monitor for such interference notification broadcast messages and, upon detecting such a notification of detected interference, the base station may be configured to determine whether or not it operates on the interfered frequency resources and, if it does, reduce the interference by reducing the transmission power and/or releasing the interfered frequency resources or swapping at least a subset of used frequency resources with other base stations. It may maintain operation on the non-interfered frequency resources of the same frequency sub-band.

In an embodiment, the broadcast message is transmitted over an X2 interface or a similar interface used for communication between base stations. Instead of the broadcast message, a unicast or a multicast message may be employed to transfer the corresponding information.

In the embodiment employing the priority orders for each frequency sub-band, the base station or spectrum controller detecting the notification of interference on a primary frequency sub-band of another cellular communication system may determine whether or not it has the lowest priority in the priority order for the interfered frequency sub-band. If it has the lowest priority order, it may take an action to reduce the interference. On the other hand, if it does not have the lowest priority order, it may discard the notification for now. Upon receiving a second notification, the base station and/or the spectrum controller may determine whether or not it has the second lowest priority for the interfered frequency sub-band and take a corresponding action. The procedure may continue in this manner until the interference is removed. An example of the priority order for the sub-bands 1, 2, 3 of FIGS. 4A to 4C is illustrated in Table 1:

TABLE 1

|  | Sub-band 1 | Sub-band 2 | Sub-band 3 |
| --- | --- | --- | --- |
| Priority order | System 3 | System 2 | System 1 |
|  | System 1 | System 3 | System 2 |
|  | System 2 | System 1 | System 3 |

Accordingly, the first cellular communication system has the highest priority, the second cellular communication system has the second highest priority, and the third cellular communication system has the third highest priority on the sub-band 3. Accordingly, the first cellular communication system may request the second and third cellular communication systems to reduce the interference towards it on the sub-band 3, and the second cellular communication system may request only the third cellular communication systems to reduce the interference towards it on the sub-band 3. The third cellular communication system has to adapt to the requests and adjust its base stations accordingly. Similar approach with different priority orders may be applied to the other sub-bands 1 and 2, as shown in Table 1.

In yet another embodiment, the spectrum controller may send a cell identifier, e.g. physical cell identifier and/or a global cell identifier of the interfered cell to the other spectrum controllers together with the information indicating the interfered frequency resources. The interfering operator may then request its cells using the same frequency resources to scan for the interfered cell. Those cells reporting that they have detected the interfered cell may then be identified as the interfering cells and the interference reduction measures may be targeted to those cells or base stations.

In an embodiment utilizing the priority orders on the frequency sub-band, the base station and/or the spectrum controller may send the adjustment request messages only when interference is detected to be caused by a base station of an operator having a lower priority order on the frequency sub-band. According to this embodiment, the base stations may carry out the measurement also on the frequency sub-bands that are not their primary frequency sub-bands. Upon detecting interference from a primary operator of the frequency sub-band, the base station and/or the spectrum controller may omit the transmission of the adjustment request.

Figure 5:
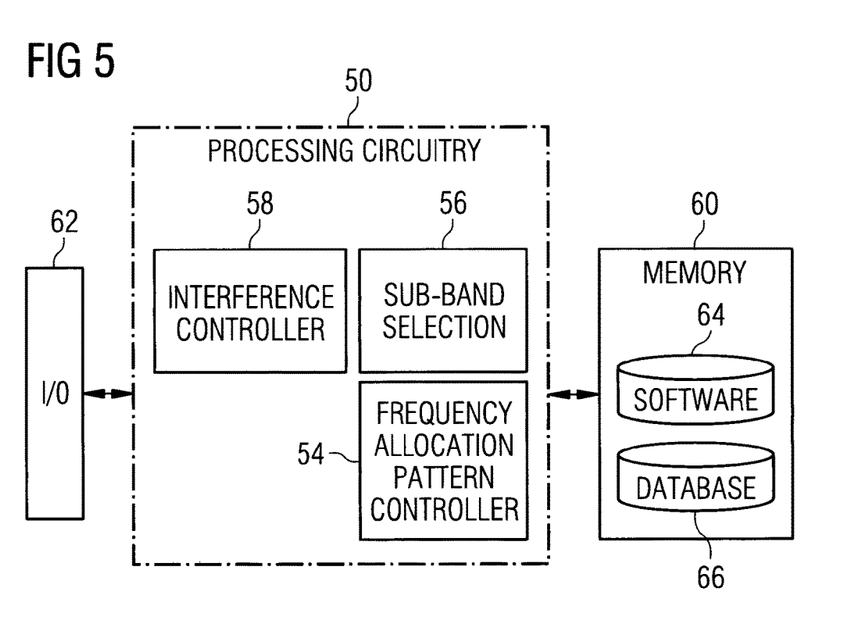
FIG. 5 illustrates a block diagram of a structure of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out the procedures of the above-described spectrum controller, e.g. in the process of FIG. 2. FIG. 5 illustrates a block diagram of a structure of such an apparatus. The apparatus may be comprised in the network apparatus of a cellular communication system, e.g. in a base station or an O&M server. The apparatus comprises a processing circuitry 50 comprising the at least one processor. The processing circuitry 50 may comprise a sub-band selection circuitry 56 configured to carry out the negotiation of the spectrum sharing policies and the selection of the primary frequency sub-band(s) in the above-described manner (steps 200, 300). Upon negotiating the spectrum sharing policies, the sub-band selection circuitry may store the policies in a database 66 stored in a memory 60 of the apparatus. Upon selecting the primary sub-band(s), the sub-band selection circuitry 56 may send a notification signal to a frequency allocation pattern controller 54 configured to determine the frequency allocation pattern for the primary frequency sub-band(s). Upon selecting the frequency allocation pattern, the frequency allocation pattern controller 54 may send a message to at least one base station of the cellular communication system, thus configuring the base station(s) to occupy the frequency resources of the primary frequency sub-band according to the frequency allocation pattern.

The sub-band selection circuitry 56 may further control the expansion of the operating frequencies to the other frequency sub-bands of the shared spectrum pool. For example, upon determining that the cellular communication system needs more capacity, the sub-band selection circuitry may select a frequency sub-band of the shared spectrum pool and outside the primary frequency sub-bands of the cellular communication system and trigger the frequency allocation pattern controller 54 to select a frequency allocation pattern for the selected frequency sub-band. If the selected frequency sub-band has the same bandwidth as one of the primary sub-bands, the frequency allocation pattern controller 54 may duplicate a frequency allocation pattern already formed for one of the primary frequency sub-bands and send a message to at least one base station of the cellular communication system, thus configuring the base station(s) to occupy the frequency resources of the expansion frequency sub-band according to the frequency allocation pattern.

The processing circuitry 50 may further comprise an interference controller circuitry 58 configured to handle the interference control, e.g. transmission and reception of the above-described adjustment request messages and adjustment command messages.

The processing circuitry 50 may comprise the circuitries 54 to 58 as sub-circuitries, or they may be considered as computer program modules executed by the same physical processing circuitry. The memory 60 may store one or more computer program products comprising program instructions that specify the operation of the circuitries 54 to 58. The apparatus may further comprise an input/output (I/O) interface providing the apparatus with communication capability over one or more communication networks, e.g. with the base station(s) of the cellular communication system and with the spectrum controller of the other cellular communication systems.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 4 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular communication systems defined above but also to other suitable communication systems. The protocols used, the specifications of communication systems and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
selecting, by a network apparatus of a first cellular communication system, a first frequency sub-band included in a shared spectrum pool of a licensed frequency spectrum as a primary sub-band, wherein the shared spectrum pool is divided into a plurality of sub-bands;
forming, by the network apparatus, a frequency allocation pattern for the first frequency sub-band and a second frequency sub-band from the plurality of sub-bands, wherein the frequency allocation pattern specifies that a first base station of the first cellular communication system has priority with respect to the first frequency sub-band and a second base station of a second cellular communication system has priority with respect to the second frequency sub-band;
causing, by the network apparatus, the at least one base station of the first cellular communication system to occupy the first frequency sub-band according to the frequency allocation pattern;
causing, by the network apparatus, the second base station of the first cellular communication system to occupy the second frequency sub-band, wherein the second frequency sub-band is a primary sub-band of the second cellular communication system;
monitoring inter-system interference on the first frequency sub-band and, upon detecting interference, performing an interference control procedure by requesting the second base station of the second cellular communication to reduce interference; and
causing the at least one base station of the first cellular communication system to occupy the second frequency sub-band by using the frequency allocation pattern that was used to specify priorities of the first base station with respect to the first frequency sub-band.

2. The method of claim 1, further comprising by the network apparatus:

detecting interference caused by the second cellular communication system on the first frequency sub-band and, as a response, causing transmission of a notification of the detected interference to the second cellular communication system.

3. The method of claim 1, further comprising by the network apparatus:
receiving, by the network apparatus from the second cellular communication system, a notification of detected interference and, as a response, causing transmission of a command to the at least one base station occupying the second frequency sub-band to reduce interference towards the second cellular communication system.

4. The method of claim 1, further comprising:
selecting the first frequency sub-band in a prioritized selection process and in communication with other one or more cellular communication systems using the shared spectrum pool, wherein a network apparatus of each cellular communication system selects a frequency sub-band in the prioritized selection process and possible conflicting selections are solved according to predetermined priority orders of the network apparatuses.

5. The method of claim 1, further comprising in the network apparatus:
negotiating with at least one network apparatus of the second cellular communication system using the shared spectrum pool, spectrum sharing policies applied to the shared spectrum pool, the spectrum sharing policies comprising at least one of the following: bandwidths of the frequency sub-bands of the shared spectrum pool, a number of radio component carriers on each frequency sub-band of the shared spectrum pool, priority order of each network apparatus to each frequency sub-band, and at least one adjustment action carried out when reducing interference towards another cellular communication system.

6. The method of claim 5, further comprising by the network apparatus:
carrying out renegotiation of the spectrum sharing policies applied to the shared spectrum pool upon occurrence of a determined event.

7. The method of claim 1, further comprising by the network apparatus:
assigning a cluster identifier to the at least one base station of the first cellular communication system occupying the second frequency sub-band.

8. A computer program product embodied on a non-transitory distribution medium readable by a computer and comprising program instructions which, when loaded into an apparatus, execute the method according to claim 1.

9. An apparatus comprising:
at least one processor; and
at least one memory including a computer program code, wherein the at least one memory and the computer program code are configured, with the at least one processor, to cause the apparatus to:
select a first frequency sub-band included in a shared spectrum pool of a licensed frequency spectrum as a primary sub-band for a first cellular communication system, wherein the shared spectrum pool is divided into a plurality of sub-bands;
form a frequency allocation pattern for the first frequency sub-band and a second frequency sub-band from the plurality of sub-bands, wherein the frequency allocation pattern specifies that a first base station of the first cellular communication system has priority with respect to the first frequency sub-band and a second base station of a second cellular communication system has priority with respect to the second frequency sub-band;
cause said at least one base station of the first cellular communication system to occupy the first frequency sub-band according to the frequency allocation pattern;
cause the second base station of the first cellular communication system to occupy the second frequency sub-band, wherein the second frequency sub-band is a primary sub-band of the second cellular communication system;
monitor inter-system interference on the first frequency sub-band and, upon detecting interference, perform an interference control procedure by requesting the second base station of the second cellular communication system to reduce interference; and
cause the at least one base station of the first cellular communication system to occupy the second frequency sub-band by using the frequency allocation pattern that was used to specify priorities of the first base station with respect to the first frequency sub-band.

10. The apparatus of claim 9, wherein the at least one memory and the computer program code are configured, with the at least one processor, to cause the apparatus to:
detect interference caused by the second cellular communication system on the first frequency sub-band and, as a response, cause transmission of a notification of the detected interference to the second cellular communication system.

11. The apparatus of claim 9, wherein the at least one memory and the computer program code are configured, with the at least one processor, to cause the apparatus to:
receive, from the second cellular communication system, a notification of detected interference and, as a response, cause transmission of a command to the at least one base station occupying the second frequency sub-band to reduce interference towards the second cellular communication system.

12. The apparatus of claim 9, wherein the at least one memory and the computer program code are configured, with the at least one processor, to cause the apparatus to:
cause the at least one base station of the first cellular communication system to occupy the second frequency sub-band by using the same frequency allocation pattern used in the first frequency sub-band.

13. The apparatus of claim 9, wherein the at least one memory and the computer program code are configured, with the at least one processor, to cause the apparatus to:
select the first frequency sub-band in a prioritized selection process and in communication with other one or more cellular communication systems using the shared spectrum pool, wherein each cellular communication system selects a frequency sub-band in the prioritized selection process and possible conflicting selections are solved according to predetermined priority orders of the cellular communication systems.

14. The apparatus of claim 9, wherein the at least one memory and the computer program code are configured, with the at least one processor, to cause the apparatus to:
carry out reselection of frequency sub-bands of the shared spectrum pool upon occurrence of a determined event.

15. The apparatus of claim 9, wherein the at least one memory and the computer program code are configured, with the at least one processor, to cause the apparatus to:
    negotiate, with at least one network apparatus of another cellular communication system using the shared spectrum pool, spectrum sharing policies applied to the shared spectrum pool, the spectrum sharing policies comprising at least one of the following: bandwidths of the frequency sub-bands of the shared spectrum pool, a number of radio component carriers on each frequency sub-band of the shared spectrum pool, priority order of each network apparatus to each frequency sub-band, and at least one adjustment action carried out when reducing interference towards another cellular communication system.

16. The apparatus of claim 15, wherein the at least one memory and the computer program code are configured, with the at least one processor, to cause the apparatus to:
    carry out renegotiation of the spectrum sharing policies applied to the shared spectrum pool upon occurrence of a determined event.

17. The apparatus of claim 9, wherein the at least one memory and the computer program code are configured, with the at least one processor, to cause the apparatus to assign a cluster identifier to the at least one base station of the first cellular communication system occupying the second frequency sub-band.

18. The apparatus of claim 9, further comprising a communication interface providing the apparatus with communication capability with the base stations of the first cellular communication system and with the second cellular communication system.

\* \* \* \* \*